May 20, 1969
J. M. BAILEY ET AL
3,444,886
FUEL INJECTION VALVE
Filed May 16, 1966
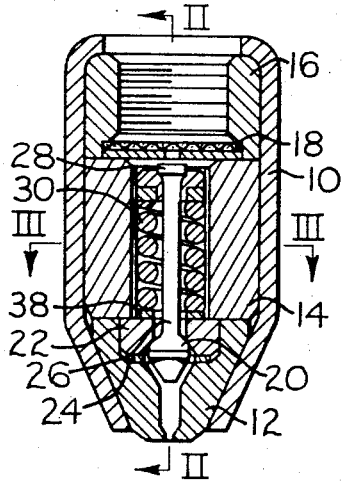
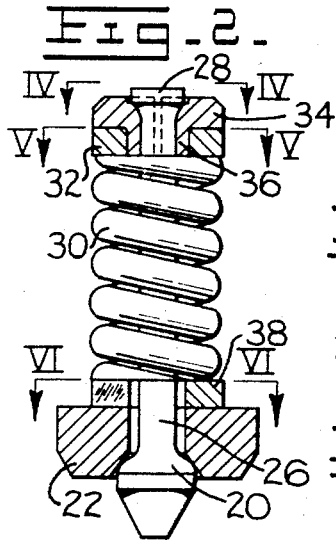
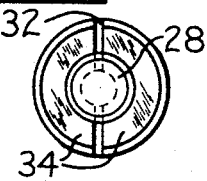
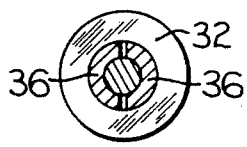
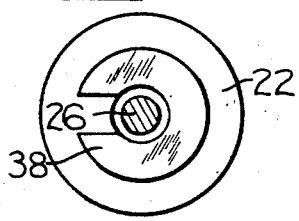
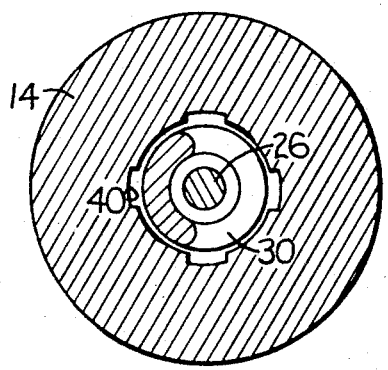
INVENTORS
JOHN M. BAILEY
MARION R. JOY
BY
ATTORNEYS

United States Patent Office 3,444,886
Patented May 20, 1969

3,444,886
FUEL INJECTION VALVE
John M. Bailey, East Peoria, and Marion R. Joy, Peoria, Ill., assignors to Caterpillar Tractor Co., Peoria, Ill., a corporation of California
Filed May 16, 1966, Ser. No. 550,407
Int. Cl. F16k 15/06; B05b 1/32; F02m 61/04
U.S. Cl. 137—541                                               1 Claim

ABSTRACT OF THE DISCLOSURE

A fuel injection valve assembly in which the valve has a stem with an enlarged end and a spring seat for the valve which is annular and has a central orifice to slide over the enlarged end. A two part member fits around the stem to prevent the valve seat from passing over the enlarged end of the stem and each of the two parts has a semicylindrical part fitting inside the spring seat to prevent separation of the two parts.

---

This invention relates to fuel injection valves and particularly to the valves of the so-called capsule type such as shown in our assignee's patent to Lloyd E. Johnson, No. 2,560,799. Valves of this type operate very rapidly and under very high pressures and with recent increased horsepower ratings for certain engines greatly increased rate of fuel flow through the valves has caused an increase in failure and reduction in valve life. Some of the difficulties experienced were traced to the design of spring retainers and guides for the valve spring used and it is the object of the present invention to remove the cause of such failures and particularly to provide a new valve assembly with improved retainer and guide means.

The foregoing objects of the invention and the manner in which they are accomplished will be more clearly understood and further and more specific objects and advantages will become apparent upon reading the following specification wherein reference is made to the accompanying drawing.

In the drawing:

FIG. 1 is a central section through a valve capsule containing a valve assembly embodying the present invention;

FIG. 2 is an enlarged view in elevation with parts in section of the valve assembly shown in FIG. 1;

FIG 3 is an enlarged sectional view taken along the line III—III of FIG. 1;

FIG. 4 is a plan view of the valve shown in FIG. 2 as viewed from the line IV—IV of FIG. 2;

FIG. 5 is a sectional view taken on the line V—V of FIG. 2; and

FIG. 6 is a sectional view taken on the line VI—VI of FIG. 2.

The valve of the present invention is shown as contained within a coined capsule as shown at 10 in FIG. 1 which is formed to receive a conventional nozzle 12 in its lower tapered end, a sleeve 14 which acts as a housing and guide for the valve itself and a nut 16 internally threaded to secure the entire assembly to a threaded part of a fuel supply bonnet (not shown). In operation of the valve, fuel is filtered through a screen 18 clamped between the body 14 and nut 16 and in the event of recurring predetermined peak pressures from a fuel pump a spring loaded check valve 20 is opened to permit fuel to be sprayed from the nozzle 12 into the combustion or precombustion chamber of a compression ignition engine. The valve 20 has a seat 22 received in the nozzle 12 and a seal 24 is disposed between the seat and the nozzle. An elongated stem 26 of the valve terminates in an enlarged end 28 which cooperates with a spring seat assembly, to be described, for one end of a valve closing spring 30, the other end of which engages a spring seat 38 resting against the valve seat element 22. In previous valves, the spring seat assembly at the inner or upper end was made as a single piece with a seat element surrounding the stem inwardly of the enlarged end 28 and having a tubular extension disposed within the end of the spring to act as a guiding member. This assembly had to be slotted to enable it to be slipped over the stem from one side. In practice, it is found that the slotted element has a tendency to cause cocking of the spring and result in rapid wear and the guide portion which is extended into the spring also resulted in wear and sometimes in metal chips finding their way through to the valve and nozzle where they could become lodged and cause trouble.

An improved inner spring seat assembly results from the present invention and comprises as best shown in FIGS. 2, 4 and 5 an annular spring seat 32 with a central opening sufficiently large to pass over the enlarged head 28 of the valve stem. This spring seat is held in place by a two-part retainer comprising a pair of semi-annular members 34 adapted to embrace the valve stem and having extensions 36 which fit within the annular seat 32 and are held against outward separation thereby thus prohibiting their passing the enlarged end 28 of the valve stem. Consequently, the annular member 32 provides a smooth continuous seat for the spring and also holds the semiannular parts 34 against separation to provide secure retaining means in conjunction with the enlargement 28 of the stem. Previously the spring seat had an extension that looked similar to the parts 36 but extended into the spring as a guide. Such guide means has been omitted in the present assembly and the bore of the spacer 14 shown in enlargement in FIG. 3 is only sligthly larger than the spring diameter, the clearance being no more than .001 inch to .005 inch, and space for ample fluid flow may be provided by broaching the bore at spaced intervals as indicated at 40 in FIG. 3.

The opposite end of the spring rests on a seat 38, as shown in FIGS. 2 and 6. which is slotted to permit its assembly around the valve stem between the end of the spring and the valve seat member 22.

The parts shown in FIG. 2 are first assembled by inserting the long valve stem through the seat 22, the spring 30, and the washer 32. The semi-annular parts 34 are then assembled into place to hold the valve stem in its assembled position. Next the spring is properly tensioned by insertion of the seat member 38. This seat member 38 must be slotted and inserted last, because were it to be in the assembly before the semi-annular members 34, the spring would not be capable of sufficient compression to permit insertion of the members 34. Before assembly, the capsule 10 is shaped as shown in FIG. 1, except that the upper edges are not turned inwardly but form a cylindrical wall continuous with the main body of the capsule. After assembly of the valve parts as shown in FIG. 2, the tapered nozzle element 12 and seal 24 are inserted in the capsule, next the valve and body 14, and finally the screen 18 and nut 16. At this time the upper edges are coined or rolled to the configuration shown to complete the valve unit.

What is claimed is:

1. A check valve comprising an annular seat member, a valve element fitting said seat member, a stem on the valve extending through the seat member and having an enlarged end, a spring surrounding the stem between the seat member and the enlarged end, a spring seat of annular configuration surrounding the stem and having a cylindrical opening therethrough of a diameter sufficient to pass over the enlarged end of the stem, two semiannular parts having axially extending semicylindrical portions passing matingly through the cylindrical opening in the spring seat and embracing the stem, said semi-annular parts having flange portions between the spring seat and the enlarged end of the stem, said spring seat preventing separation of the parts and confining them in abutting relationship with the enlarged end of the stem.

References Cited

UNITED STATES PATENTS

| | | | |
|---|---|---|---|
| 2,410,946 | 11/1946 | Johnson | 137—541 |
| 2,560,799 | 7/1951 | Johnson | 29—156.7 X |
| 2,912,002 | 11/1959 | Miller | 137—541 |
| 3,077,874 | 2/1963 | Bush | 251—337 X |
| 1,537,555 | 5/1925 | Schenk | 251—337 |
| 2,040,960 | 5/1936 | Smith | 251—337 |
| 2,792,845 | 5/1957 | Atherton et al. | 251—363 X |
| 2,854,021 | 9/1958 | Baldwin et al. | 251—363 X |

WILLIAM F. O'DEA, *Primary Examiner.*

DENNIS H. LAMBERT, *Assistant Examiner.*

U.S. Cl. X.R.

239—533; 251—337